(12) United States Patent
Meyer et al.

(10) Patent No.: US 6,880,798 B2
(45) Date of Patent: Apr. 19, 2005

(54) SENSING AND CONTROL OF VALVE FLOW RATE

(75) Inventors: Ronald W. Meyer, Jefferson County, MO (US); David L. Hart, Jefferson County, MO (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 10/615,734

(22) Filed: Jul. 9, 2003

(65) Prior Publication Data

US 2005/0006489 A1    Jan. 13, 2005

(51) Int. Cl.[7] ................................. F23N 5/00
(52) U.S. Cl. .................. 251/129.08; 431/12
(58) Field of Search ........... 236/75, 78 D; 251/129.08, 251/129.11; 73/204.15, 204.25; 702/45, 702/100; 431/12

(56) References Cited

U.S. PATENT DOCUMENTS

| | | |
|---|---|---|
| 4,070,604 A | 1/1978 | Usry |
| 4,097,786 A | 6/1978 | Lund |
| 4,608,820 A | 9/1986 | White et al. |
| 4,684,367 A | 8/1987 | Schaffer et al. |
| 4,756,688 A | 7/1988 | Hammond et al. |
| 4,921,210 A * | 5/1990 | Hutchison et al. ..... 251/129.08 |
| 5,011,112 A | 4/1991 | Glamm |
| 5,243,858 A | 9/1993 | Erskine et al. |
| 5,493,100 A | 2/1996 | Renger |
| 5,975,485 A | 11/1999 | Tsai et al. |
| 6,032,525 A | 3/2000 | Suetake |
| 6,085,588 A | 7/2000 | Khadkikar et al. |
| 6,349,922 B1 | 2/2002 | Rydin |
| 6,375,086 B1 | 4/2002 | Babin et al. |
| 6,389,364 B1 | 5/2002 | Vyers |
| 6,419,478 B1 | 7/2002 | Kemp |
| 2002/0030461 A1 | 3/2002 | Chian |

* cited by examiner

Primary Examiner—Harry B. Tanner
(74) Attorney, Agent, or Firm—Harness Dickey & Pierce, P.L.C.

(57) ABSTRACT

A gas valve for controlling the flow of gas to a burner. An actuator controls the flow of gas through the valve. A stepper motor operates the actuator. A first temperature sensor senses temperature of gas entering the valve. A second temperature sensor senses temperature of gas leaving the valve. A controller controls the stepper motor in response to the sensed temperatures. This gas valve provides universal single-stage, multi-stage and modulating gas flow control for appliances and furnaces.

29 Claims, 4 Drawing Sheets

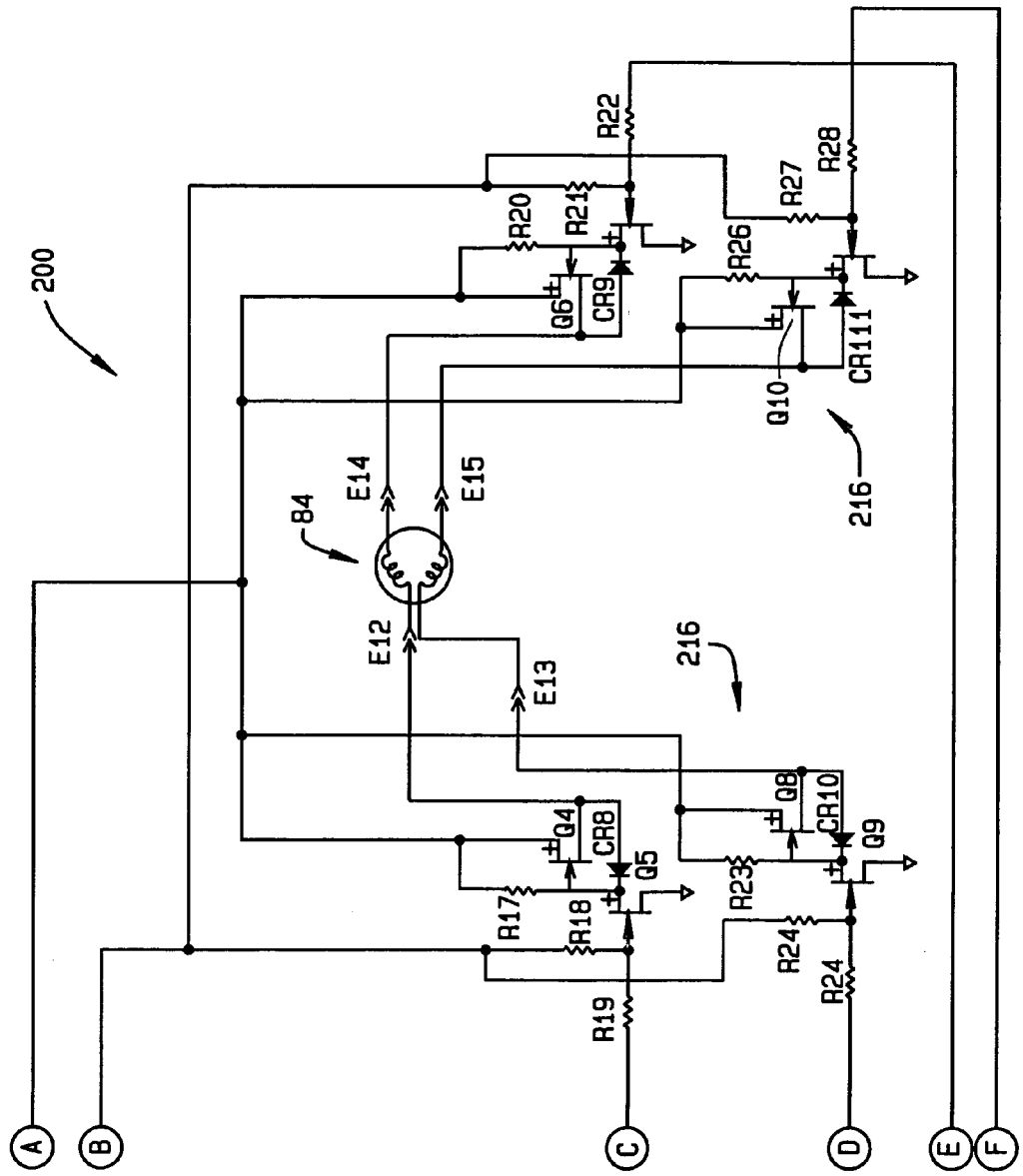

US 6,880,798 B2

SENSING AND CONTROL OF VALVE FLOW RATE

FIELD OF THE INVENTION

The present invention relates to gas furnaces and appliances and, more particularly, to controls for gas input to gas furnaces and appliances.

BACKGROUND OF THE INVENTION

In gas appliances and furnaces, diaphragms and/or solenoids are commonly used for controlling the level of gas flow through a gas valve to a burner. Flow-control solenoids typically are actuated by continuous signals from a low-voltage power source. For this reason and for other reasons, valve control via diaphragms and solenoids tends to be complex and costly. In gas fireplace units, gas flow control may be via a stepper-motor-controlled valve, which can vary gas flow without a diaphragm and is powered by intermittent low-voltage signals. Such valves can vary gas flow to vary fireplace flame, but cannot sense outlet flow rate or adjust outlet flow to a desired flow rate value.

SUMMARY OF THE INVENTION

The present invention, in one embodiment, is directed to a gas valve for controlling the flow of gas to a burner. The gas valve includes an actuator that controls the flow of gas through the valve. A stepper motor operates the actuator. A first temperature sensor senses temperature of gas entering the valve. A second temperature sensor senses temperature of gas leaving the valve. A controller controls the stepper motor in response to the sensed temperatures.

Further areas of applicability of the present invention will become apparent from the detailed description provided hereinafter. It should be understood that the detailed description and specific examples, while indicating various embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 4B is continuous with FIG. 4A and is a partial schematic diagram of the embodiment of a gas valve control system shown in FIG. 4A.

DETAILED DESCRIPTION OF THE INVENTION

The following description of various embodiment(s) is merely exemplary in nature and is in no way intended to limit the invention, its application, or uses.

Figure 1:
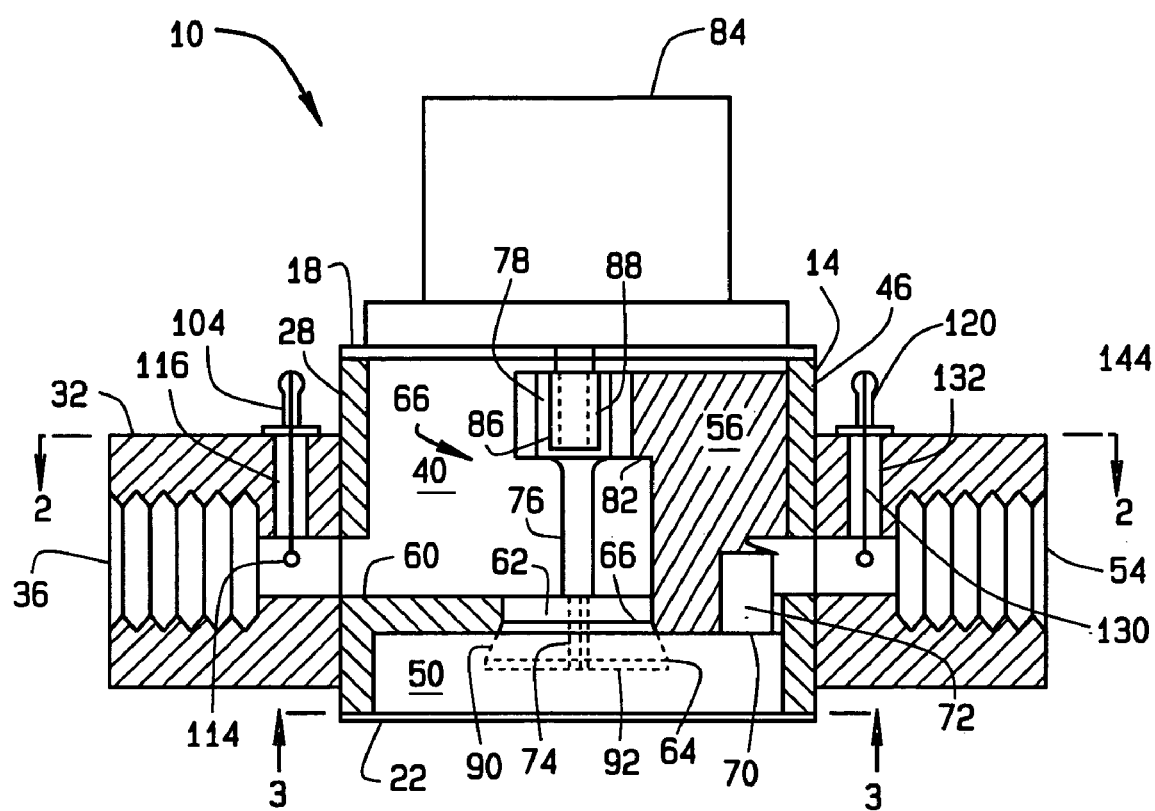
FIG. 1 is a longitudinal cross-sectional view of a gas valve in accordance with one embodiment of the present invention.
Figure 2:
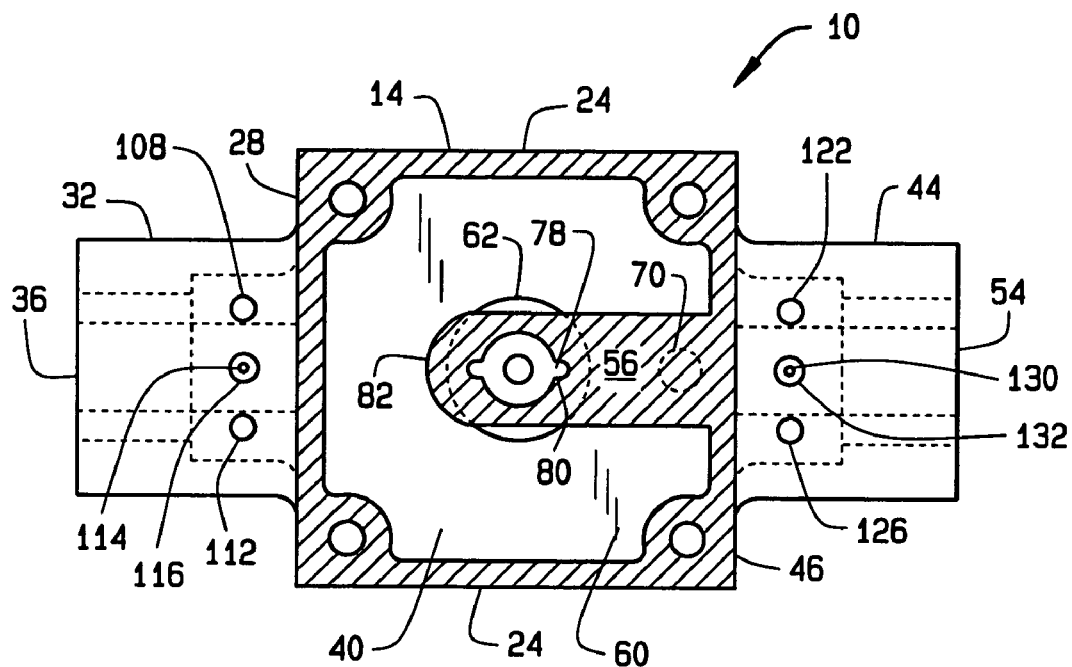
FIG. 2 is a cross-sectional view of the valve embodiment shown in FIG. 1, taken along the plane of line 2—2 in FIG. 1.

A gas valve according to one embodiment of the present invention is indicated generally in FIG. 1 and FIG. 2 by reference number 10. The gas valve 10 is used, for example, to control gas flow to a burner in a gas appliance or gas furnace. The valve 10 has a body 14 fabricated, for example, of cast aluminum. The valve body 14 has a top plate 18, a bottom plate 22, two side plates 24, and an inlet plate 28 from which extends an inlet block 32. A gas inlet 36 extends through the inlet block 32 and opens into an inlet chamber 40 in the body 14. An outlet block 44 extends from an outlet plate 46 of the valve body 14. An outlet chamber 50 is fluidly connected with a gas outlet 54 extending through the outlet block 44.

A bracket 56 extends within the body 14 from the outlet plate 46. The bracket 56 is integral with a separator plate 60 that separates the inlet chamber 40 from the outlet chamber 50. The separator plate 60 has a central, generally circular opening 62 that fluidly connects the inlet and outlet chambers 40 and 50 when a poppet 64 operable by a linear actuator 66 is in an open position as further described below.

Figure 3:
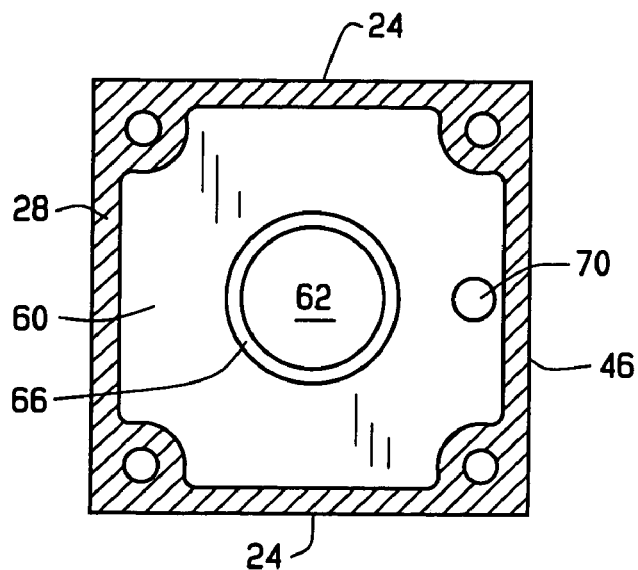
FIG. 3 is a cross-sectional view of a floor of the valve embodiment shown in FIG. 1, taken along the plane of line 3—3 in FIG. 1.

FIG. 3 is a plan view of the separator plate 60, taken along the plane of line 3—3 in FIG. 1. The opening 62 has a chamfered edge 66 against which the poppet 64 fits snugly when in a closed position as shown in FIG. 1. Another opening 70 in the separator plate 60 opens into a passage 72 through the bracket 56 that fluidly connects the outlet chamber 50 with the gas outlet 54.

The poppet 64 is mounted on a lower end 74 of a poppet shaft 76. A key-shaped upper end 78 of the poppet shaft 76 is movably mounted in a vertical key-shaped channel 80 in an arm 82 of the bracket 56. The poppet shaft 76 can be driven up and/or down by a stepper motor 84 mounted on the top plate 18. Specifically, a threaded shaft end 86 of the motor 84 extends through the top plate 18 into a threaded sleeve 88 such that rotational movement of the motor 84 is translated into linear movement of the poppet shaft 76. The keyed shapes of the channel 80 and shaft end 78 keep the poppet shaft 76 from rotating while the shaft 76 is moved up or down. It is contemplated that in other embodiments, other linear actuating elements could be utilized to move the poppet shaft 76 up and/or down.

The poppet shaft 76 and poppet 64 are concentrically aligned with the opening 62. The poppet 64 has a top portion 90 fabricated, for example, of rubber, and a lower plate 92 fabricated, for example, of aluminum. The plate 92 is affixed to the lower end 74 of the poppet shaft 76 and supports and stabilizes the rubber portion 90 relative to the poppet shaft 76. The poppet 64 is shaped so as to fit snugly against the chamfered edge 66 of the opening 62 when the poppet 64 is in the closed position.

Examples of such system-controlled printing and promotional tickets may be found I co-pending U.S. patent application Ser. No. 10/349,874, titled "System and Method for Electronic Game Promotion," filed Jan. 22, 2003; and U.S. patent application Ser. No. 10/308,768, titled "System for Electronic Game Promotion," filed Dec. 2, 2002; incorporated by reference herein.

When the stepper motor 84 is activated to lower the poppet shaft 76, the poppet 64 is lowered from the closed position. When the poppet 64 is in an open position, gas can pass from the inlet chamber 40 through the opening 62 into the outlet chamber 50, at a flow rate determined by how far the poppet 64 is lowered from the closed position. In the embodiment shown in FIG. 1, the poppet 64 is hemispherically shaped, although embodiments are contemplated wherein the poppet and/or opening between the chambers may have other shapes and/or contours.

An inlet temperature sensor 104, e.g., a thermistor, is mounted in the inlet block 32 and connected to terminals 108 and 112. A lead 114 of the inlet thermistor 104 extends through a passage 116 into the gas inlet 36. An outlet temperature sensor 120, e.g., a thermistor, is mounted in the outlet block 44 and connected to terminals 122 and 126. A lead 130 of the outlet thermistor 120 extends through a passage 132 into the gas outlet 54. The temperature sensors 104 and 120 are, for example, thermistors having part number 2322 626 23102, available from BC Components International B.V., Alpharetta, Ga. 30076. It is contemplated that, in other embodiments, other temperature-sensing devices, including but not limited to transistors and/or resistance temperature detectors, could be used to sense gas temperature(s) in the gas inlet and outlet. In other embodiments, temperature sensor 104 may be different from temperature sensor 120.

Figure 4A:
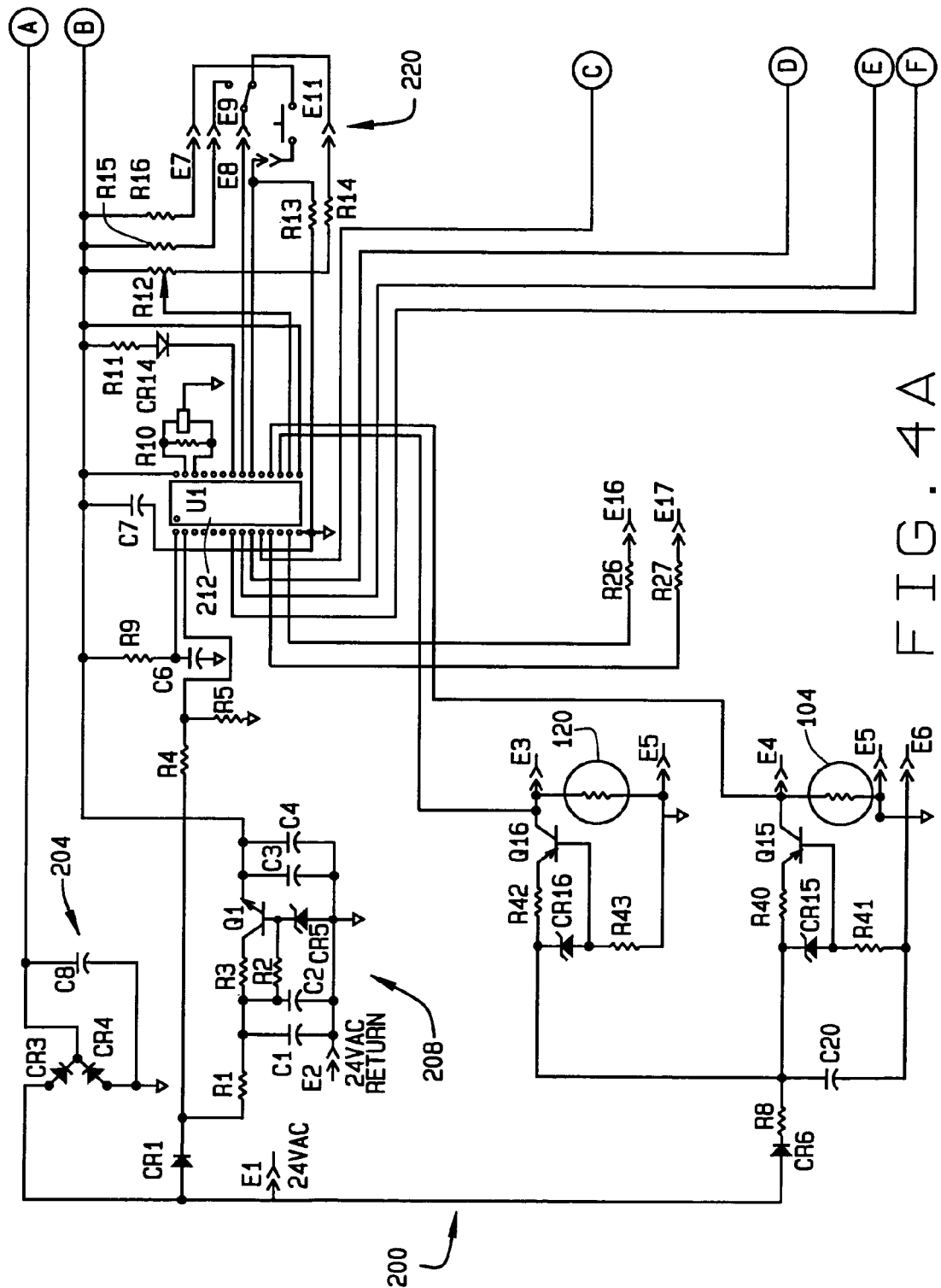
FIG. 4A is a partial schematic diagram of an embodiment of a gas valve control system.

An embodiment of a control system for controlling gas flow through the valve 10 is indicated generally in FIGS. 4A and 4B by reference number 200. The controller 200 includes a half-wave rectifier circuit indicated generally by reference number 204, a processor power supply circuit indicated generally by reference number 208, and a processor 212, e.g., an erasable programmable read-only memory (EPROM) 68HC705P6A, available from Motorola, Inc., http://www.motorola.com. The stepper motor 84 is driven in forward and/or reverse directions via a pair of driver circuits 216 under control of the processor 212. The processor 212 controls a signal that indicates a number of angular steps through which the motor shaft 86 is to rotate and thereby drive the poppet shaft 76. Mechanical switches, indicated schematically by reference number 220, are used to provide manual test control for starting, stopping and/or changing direction of the stepper motor 84. The stepper motor 84 is, for example, a 1.8-degree, size 23 single-shaft hybrid motor available from Source Engineering Inc. of Santa Clara, Calif.

As shown in FIG. 4A, the inlet thermistor 104 is electrically connected between a terminal E4 and a grounded terminal E5. In the present exemplary embodiment, wherein the pins 108 and/or 112 (shown in FIG. 2) are insulated from ground, the terminal E5 provides grounding, for example, through the valve 10 aluminum casting. The inlet thermistor 104 receives a constant current supply of, for example, about 0.0001 ampere, a current sufficiently low to prevent the inlet thermistor 104 from self-heating. The outlet thermistor 120 is electrically connected between a terminal E3 and the ground E5. The outlet thermistor 120 receives a constant current supply of, for example, about 0.05 ampere, a current sufficiently high to allow the outlet thermistor 120 to self-heat to a predetermined level.

A resistor R26 is configured with the inlet thermistor 104 such that a voltage drop across the resistor R26 corresponds to a temperature sensed by the inlet thermistor 104. A resistor R27 connected across the outlet thermistor 120 is configured with the outlet thermistor 120 such that a voltage drop across the resistor R27 corresponds to a temperature sensed by the outlet thermistor 120. Resistors R26 and R27 preferably have equal resistance, for example, 8.2 kΩ.

During operation of the gas valve 10, as gas enters the inlet 36, the inlet thermistor 104 senses temperature of the gas in the inlet 36. The temperature is signaled to the processor 212 via resistor R26. When the poppet 24 is in an open position, gas flows from the inlet chamber 40 to the outlet chamber 50 and through the outlet 54. The outlet thermistor 120 senses heat removed by gas flow at the outlet 54. The thermistor temperature is signaled to the processor 212 via resistor R27.

As gas flows through the valve 10, it tends to draw heat from the self-heated outlet thermistor 120. The amount of heat drawn by the gas from the thermistor 120 corresponds to a gas flow rate through the valve 10. The processor 212 periodically compares the temperature of the inlet thermistor 104 with the temperature of the outlet thermistor 120 and uses the temperatures to determine a gas flow rate through the valve 10. Based on the determined gas flow rate, the processor 212 signals the stepper motor 84 to operate the poppet 64 so as to adjust the flow rate through the valve 10 in accordance with a desired flow rate.

It can be appreciated that an embodiment of a gas valve that includes a stepper motor and differential thermistor flow sensing as described above can provide universal single-stage, multi-stage and modulating gas flow control in a gas appliance or furnace. The above described gas valve is capable of sensing a gas flow rate, and of maintaining a selected outlet gas flow rate, for single-stage, multi-stage and/or modulated burner applications.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A gas valve for controlling the flow of gas to a burner, the gas valve comprising:
    an actuator that controls the flow of gas through the valve;
    a stepper motor that operates the actuator;
    a first temperature sensor that senses temperature of gas entering the valve;
    a second temperature sensor that senses temperature of gas leaving the valve; and
    a controller that controls the stepper motor in response to the sensed temperatures.

2. The gas valve of claim 1 wherein the actuator comprises a linear actuator.

3. The gas valve of claim 1 wherein at least one of the temperature sensors comprises a thermistor.

4. The gas valve of claim 1 wherein the first temperature sensor is prevented from self-heating.

5. The gas valve of claim 1 wherein the second temperature sensor is allowed to self-heat.

6. The gas valve of claim 1 wherein the first temperature sensor comprises a lead in an inlet of the gas valve and the second temperature sensor comprises a lead in an outlet of the gas valve.

7. The gas valve of claim 1 wherein the controller uses a heat loss by the second temperature sensor to determine the gas flow rate.

8. The gas valve of claim 1 wherein the actuator is between an inlet and an outlet of the valve.

9. The gas valve of claim 1 further comprising an inlet chamber, an outlet chamber, and a poppet on the actuator operable between the chambers to control the flow of gas through the valve.

10. A gas valve for controlling the flow of gas to a burner, the gas valve comprising:
- an actuator that controls the flow of gas through the valve;
- a first temperature sensor that senses temperature of gas entering the valve;
- a second temperature sensor that senses temperature of gas leaving the valve;
- a controller that determines a gas flow rate based on the sensed temperatures; and
- a stepper motor that drives the actuator in response to the determined gas flow rate.

11. The gas valve of claim 10 wherein the actuator comprises a linear actuator.

12. The gas valve of claim 10 wherein at least one of the temperature sensors comprises a thermistor.

13. The gas valve of claim 10 wherein the first temperature sensor is prevented from self-heating.

14. The gas valve of claim 10 wherein the second temperature sensor is allowed to self-heat.

15. The gas valve of claim 10 wherein the first temperature sensor comprises a lead in an inlet of the gas valve and the second temperature sensor comprises a lead in an outlet of the gas valve.

16. The gas valve of claim 10 wherein the controller uses a heat loss by the second temperature sensor to determine the gas flow rate.

17. The gas valve of claim 10 wherein the actuator is between an inlet and an outlet of the valve.

18. The gas valve of claim 10 further comprising an inlet chamber, an outlet chamber, and a poppet on the actuator operable between the chambers to control the flow of gas through the valve.

19. A gas combustion system comprising a gas burner and a gas valve that controls the flow of gas to the burner and having a first temperature sensor in an inlet of the valve and a second temperature sensor in an outlet of the valve, the temperature sensors providing information from which is obtained a gas flow rate through an inlet chamber and an outlet chamber of the valve;
- the valve further comprising a stepper motor and a poppet operable between the chambers via the stepper motor for adjusting the gas flow rate.

20. The gas combustion system of claim 19 further comprising a controller that determines an adjustment to the gas flow rate using input from the temperature sensors.

21. The gas combustion system of claim 19 wherein the stepper motor is mounted on an outer surface of the gas valve, and wherein a shaft of the motor extends through the surface into the valve, the poppet operable via the shaft.

22. A method of controlling the flow of gas through a gas valve having an inlet connected with an inlet chamber, an outlet chamber fluidly connectable to the inlet chamber, and an outlet connected with the outlet chamber, the method comprising:
- determining temperatures of the inlet and outlet;
- determining a flow rate adjustment based on the temperatures; and
- translating rotational movement by a stepper motor shaft into linear movement by a poppet between the chambers to apply the determined flow rate adjustment.

23. The method of claim 22 wherein determining temperatures comprises receiving inputs from a first temperature sensor having a lead in the inlet and from a second temperature sensor having a lead in the outlet.

24. The method of claim 23 wherein determining a flow rate adjustment comprises:
- allowing the second temperature sensor to self-heat; and
- determining a heat loss by the self-heated temperature sensor.

25. The method of claim 22 further comprising supplying constant and unequal currents to first and second temperature sensors.

26. An improved gas appliance having a burner and a gas valve through which the flow of gas to the burner is controlled via a linear actuator, the improvement comprising:
- a pair of thermistors configured to indicate a gas flow rate through the valve; and
- a stepper motor that drives the actuator in response to the indicated gas flow rate.

27. The improved gas appliance of claim 26 wherein the thermistors comprise a first thermistor configured to sense temperature in an inlet of the valve, and a second thermistor configured to sense temperature in an outlet of the valve.

28. The improved gas appliance of claim 26, wherein the improvement further comprises the actuator having a poppet driven by the stepper motor to fluidly connect inlet and outlet chambers of the valve.

29. A gas valve comprising:
- an inlet;
- an outlet;
- a valve seat;
- a valve member operable relative to the valve seat to open and close the valve to control the flow therethrough;
- a stepper motor for operating the valve member; and
- a control system comprising an inlet temperature sensor, an outlet temperature sensor, and a control for controlling the stepper motor to operate the valve member in response to the temperatures sensed by the inlet temperature sensor and outlet temperature sensor.

* * * * *